United States Patent
Chapman et al.

(10) Patent No.: US 6,724,869 B2
(45) Date of Patent: Apr. 20, 2004

(54) MULTIMODAL TELEPHONE NUMBERS

(75) Inventors: Robert E. Chapman, Raleigh, NC (US); Asser N. Tantawi, Somers, NY (US); Edith H. Stern, Yorktown Heights, NY (US); Barry E. Willner, Briarcliff Manor, NY (US)

(73) Assignee: International Business Machines Corporation, Armonk, NY (US)

( * ) Notice: Subject to any disclaimer, the term of this patent is extended or adjusted under 35 U.S.C. 154(b) by 190 days.

(21) Appl. No.: 09/919,160

(22) Filed: Jul. 31, 2001

(65) Prior Publication Data

US 2003/0026394 A1 Feb. 6, 2003

(51) Int. Cl.[7] ............................................. H04M 11/00
(52) U.S. Cl. ................. 379/93.01; 379/93.25; 379/93.08; 379/265.09
(58) Field of Search ................. 379/93.01, 93.08–93.11, 379/93.14–93.17, 93.24, 93.25, 100.01, 100.08–100.17, 88.13, 88.14, 88.23, 201.01, 265.01, 265.02, 265.05, 265.09, 67.1, 230; 375/222; 370/259–261; 709/229

(56) References Cited

U.S. PATENT DOCUMENTS

| | | | |
|---|---|---|---|
| 5,025,443 A | | 6/1991 | Gupta |
| 5,278,889 A | * | 1/1994 | Papanicolaou et al. .. 348/14.01 |
| 5,592,538 A | | 1/1997 | Kosowsky et al. |
| 5,684,825 A | * | 11/1997 | Ko ............................. 375/222 |
| 5,862,202 A | * | 1/1999 | Bashoura et al. ...... 379/100.14 |
| 5,894,512 A | * | 4/1999 | Zenner .................. 379/265.02 |
| 5,949,763 A | * | 9/1999 | Lund .......................... 370/261 |
| 6,389,117 B1 | * | 5/2002 | Gross et al. ............. 379/88.23 |
| 6,438,599 B1 | * | 8/2002 | Chack ........................ 709/229 |
| 6,539,077 B1 | * | 3/2003 | Ranalli et al. ............. 379/67.1 |

FOREIGN PATENT DOCUMENTS

| | | | | |
|---|---|---|---|---|
| WO | WO 200054488 A1 | * | 9/2000 | .......... H04M/11/00 |
| WO | WO 200103354 A2 | * | 1/2001 | .......... H04L/00/00 |

OTHER PUBLICATIONS www.att.com/technology/history/chronolog/70picture.html.
www.upstreamworks.com/products/PackagedSolutions.htm.
www.telecorpproducts.com.
2f_phones0117200204957.gif; C\temp/c.notes.d...cameras in cellphones–WSJ011801.htm.

* cited by examiner

*Primary Examiner*—Wing Chan
(74) *Attorney, Agent, or Firm*—Douglas W. Cameron; Anne V. Dougherty

(57) ABSTRACT

Data communication between a data sender and at least one data recipient is facilitated when the data recipient is associated with a telephone number that can not be used to access the user with a telephone call. An invention receives the telephone number associated with the data destination (data recipient) and receives an indication that data is to be communicated. The invention uses the telephone number to determine at least one characteristic of data destination/recipient. The invention also receives at least one characteristic of the data to be communicated that enable the data to be communicated to the data receiver/recipient.

26 Claims, 13 Drawing Sheets

| 1200 | | |
|---|---|---|
| 555-0000 | zeros@aol.com | |
| 555-0123 | www.informationxyz.com | |
| 555-1200 | www.1200.org | |
| 555-1240 | 129.42.18.99 | |
| 570-3344 | 9.2.104.63 | |
| 570-3999 | georgex@www.whitehouse.gov | |
| 590-4100 | johndoe@hotmail.com johndoe@baskerville.org johndoe@earthlink.net | |

| |
|---|
| mom@aol.com |
| dad@earthlink.com |
| estern@us.ibm.com |
| www.helpdesk.com |
| www.carguys.org |
| 9.2.104.60 |

Fig. 12B

MULTIMODAL TELEPHONE NUMBERS

FIELD OF THE INVENTION

This invention relates to the integration of data communications and telephony. More specifically, the invention relates to associating data addresses with telephone numbers.

BACKGROUND OF THE INVENTION

Today many people have access to both voice communications and to data communications. Voice communications is still typically over the PSTN, including both the wireline and cellular or other mobile variants. We use the model we have for over a hundred years. We dial a telephone number and initiate a voice conference. Therefore essentially all voice communications fits into the PSTN paradigm.

The types of data communications are more varied. People have one or more e-mail addresses, one or more IP addresses which could be dynamic and changing and have multiple applications to receive data communications. These include e-mail, various "screen pops" of still images and streaming media.

Recipients with specialized hardware and software can receive integrated voice and data communications, for example with video conferencing. The sender cannot send voice and data together without having intimate knowledge of the data characteristics of the recipient.

The following paragraphs discuss voice and data delivery mechanisms. In these, the voice and data either share physical infrastructure with no logical connection, or they are tightly connected, placing a strict dependence for compatible protocol and hardware and software from sender to receiver.

Voice and Data Delivery

Digital subscriber lines are in widespread use for the delivery of both data and voice. The two common variants of digital subscriber lines are ADSL (Asynchronous Digital Subscriber Line) and HDSL (High-speed Digital Subscriber Line), generically called xDSL. As the names imply, they exist only between the central office and the subscriber's location. The technology is designed to provide a substantial amount of data transmission (up to several megabits per second) on ordinary copper distribution cables without disturbing the analog voice circuit for which the distribution was originally designed and installed. ADSL provides a greater data download (central office to subscriber) bit rate than upload (subscriber to central office) bit rate, for example, 2 megabits download, 384 kilobits upload. HDSL provides a full duplex facility for customers who need high upload as well as download bit rates. In both cases the technology provides a data path that is logically separate from the voice path. The data cannot be directed to specific addresses based on numbers dialed over the voice circuit, nor can the voice be delivered based on any data transaction which occurs over the digital circuit. The technology is basically a splitting circuit at each end of a copper path that allows both analog voice and digital data (processed by modems) to share the facility. The degree of isolation is indicated by the fact that if the splitting equipment loses power, the voice channel continues to work.

Simultaneous Voice and Data (SVD) protocols share voice and data, allowing users to employ a single line for both voice and data communications. With SVD technology, Personal Computer users with a single standard telephone line can send a file while talking to the receiving party, work on shared files while discussing the content, or perform other collaborative tasks across one line. SVD operation originates in one of two ways: users call one another and converse as usual, then drop into SVD mode when they launch a communication application; or users initiate a modem connection and the modems drop into SVD mode when the handset is picked up or the speakerphone is engaged by one of the users.

Shared voice and data is taught by many patents. U.S. Pat. No. 5,878,120, "Mechanism and method for multiplexing voice and data over a signal carrier with high bandwidth efficiency" describes a method and apparatus for such SVD function. This includes a micro-controller having multiple operating modes, including an idle mode, an analog voice mode, a digital data mode, and a simultaneous voice and data (SVD) mode, which is provided to a data circuit terminating equipment (DCE) device designed to support multi-modal voice and/or data calls over a single analog-loop telephone line. The micro-controller contains control logic for establishing multiple logical connections and voice as well as data transmission protocols over these logical connections with another DCE, when switching from the analog voice mode to the SVD mode, and for multiplexing voice and data transmissions over these logical connections. The control logic transmits voice over a logical voice connection in nominally fixed intervals. A non-voice transmission, i.e. data or information to be exchanged, can be suspended in favor of transmitting a voice transmission. After the voice transmission is complete, the data transmission is continued. This allows multiplexing of reliable data and real-time data (e.g., voice) on a single modem link.

U.S. Pat. No. 5,592,538, "Telecommunication device and method for interactive voice and data", teaches mixed communication by both voice and data including visual text messages during a single telephone call, with both modes of communication able to be bi-directional. It also teaches an interactive voice and data (IVD) subscriber system, any two of which may communicate with each other, and optionally an IVD host system which allows IVD subscriber system unit to IVD host communication. The IVD subscriber system and host are compatible with the PSTN for voice communication. Data management facilities are provide for enabling the exchange of data with other devices. Data from a database may be selected, transmitted, received, merged, displayed and otherwise used by devices.

U.S. Pat. No. 5,025,443, "Digital data over voice communication", teaches another method of voice and data sharing on a single twisted pair line. In the apparatus taught by this patent, a coding circuit is used to encode the data signal prior to transmission. The coding circuit encodes the data signal in such a manner that the voice band is vacated and the signal energy is spread over a relatively broad frequency spectrum. Thus, the energy is not clustered in a narrow band and cross-talk is minimized. Baseband transmission is employed so that signal errors are avoided. No modulators or demodulators are required. The empty voice band can then be used for base band "Plain Old Telephone System" (POTS) communication.

Cellular Systems

First-generation cellular telephone systems, e.g. AMPS (American Mobile Phone System), an analog system, provided no data facilities. These systems accommodated data only as voice band data which was converted to analog tones by modems external to the mobile unit, e. g. in a mobile facsimile attachment. As a result of this method the data was always delivered to the point specified by the telephone number which had been dialed, specifically to an analog telephone termination on the PSTN. At the PSTN termination a modem had to be provided to convert the voice band data into digital data. Data rates were limited to what could be accommodated through the analog CODECs which were optimized for speech, usually less than 9.6 kilobits/second.

Second-generation cellular telephone systems, e.g. Digital American Mobile Phone System (DAMPS) in the US and Global System for Mobile (GSM) globally, plus others, are data-capable because they provide for multiple mobile-unit to base station channels time-division multiplexed into each radio-frequency transmission channel. It is therefore possible to have a mobile unit use one Time Division Multiplexing (TDM) channel for speech and a second TDM channel on the same RF frequency for data. External factors such as RF energy levels, battery life, and channel efficiency have tended to limit use of this capability.

GPRS, or General Packet Radio Service, is a "generation 2.5" data adjunct to the GSM system. GPRS creates an overlay data network which attaches to the cellular system at base stations to which Packet Control Units (PCUs) have been added. PCUs split the proprietary data stream away from the voice and deliver the data to the packet data network, using the GPRS Tunneling Protocol to forward the data packets to a Gateway GPRS Support Node (GGSN). The GGSN converts GTP packets to TCP/IP packets and places them on the Internet for normal delivery. GPRS provides for simultaneous data and voice from a mobile unit, with the voice going to the dialed PSTN number and the data (the typical application is Internet access) going to a specific URL which is keyed into the mobile unit and saved. This is effective for Internet connections which essentially run in the background and are not associated with whatever telephone number the mobile unit may decide to speak with. But no simple process is presently provided for users who may wish to send video or other data to the person with whom they are speaking.

Devices

Cellular telephone devices are being manufactured to handle not only voice but data, and in particular image. The Nokia Communicator 9110 includes digital camera connectivity. This feature "allows the user to transfer pictures from a compatible digital camera into the communicator. The user can view the images, convert them to JPEG format and send them in faxes, as e-mail attachments or as ftp." Http://www.nokia.com/phones/9110/faq4.html. The camera to be connected must be digital and equipped with an infrared port supporting IrTran-P communications such as a Casio QV-2000UX or Sharp VE-LC2. Jphone is currently selling a telephone, manufactured by Sharp Corporation which incorporates a small camera. (See Wall Street Journal, "Japanese Cell phones Will Feature Cameras, Digital Video Screens", Jan. 18, 2001.)

Video Conferencing

When video (including audio) is provided on a point to point bi-directional basis, it is known as videoconferencing. In addition to room-to-room videoconferencing, in recent years desktop conferencing has become available geared to corporate users who are extending the communication capabilities of the audio teleconference. Desktop video conferencing, using video inputs devices at workstations, is offered by a number of vendors. The Intel® ProShare Video System 500 is designed to be installed in a desktop PC in 30 minutes, and provide the ability to conduct video calls. These systems use LAN or ISDN telephone lines to provide video imaging of conference call participants to other participants.

AT&T built the first Picturephone test system in 1956. By 1964 a complete experimental system, the "Mod 1," had been developed. To test it, the public was invited to place calls between special exhibits at Disneyland and the New York World's Fair. Http://www.att.com/technology/history/chronolog/70picture.html. This device required specialized receiving hardware as well as sending hardware. Picturephone features are now incorporated into the desktop video conferencing systems described above.

Traditional videoconferencing systems allow multiple remote participants to share their video (as well as audio and data) streams. Typically, the system includes multimedia terminals, multimedia communication means, bridging (or mixing) equipment, and controlling software. Standards videoconferencing protocols have been adopted in this industry.

Automated Call Centers-ACDs

Automated Call Centers and Automatic Call Distributors, or ACDs, are used when multiple operators are needed to "answer the phone". In customer service bureaus, enterprise help desks, anyplace that 800 numbers resolve to an operator (including the telephone company), ACDs are used to deliver the call to an available operator. ACDs are sold by many vendors, such as Telecorp (http://www.telecorpproducts.com), Teltone, Nortel (www.nortelnetworks.com), Avaya (formerly part of Lucent) and others. ACDs used for customer relationship management (CRM) are frequently provided with software solutions that enable "screen pops". These are solutions that tie the incoming calling number to a customer data record for the owner of that calling number. Upstream Works http://www.upstreamworks.com/products/PackagedSolutions.htm offers prepackaged solutions such as: eMedia Simple Screen Pop with LogoPop to provide a screen pop with calling number information to the desktop with no host integration required. Extensions allow a customer's account number to be displayed.

PROBLEMS WITH THE PRIOR ART

We now discuss problems with the prior art for integrated voice and data communications. The prior art falls into two categories. Either the voice and data share physical infrastructure with no logical connection what ever, or they are connected, placing a strict dependence for compatible protocols, hardware, and software from sender to receiver. There is a need to overcome this limitation of the prior art.

In first generation systems, channels are designed to handle voice traffic and therefore analog transmission techniques are used. In order to transmit data, it is modulated at the sending end and demodulated at the receiving end. This severely limits the capacity of data transmission. Multiplexing voice and data on the same channel is possible, however the multiplexed traffic is treaded as a single analog stream that is switched in the network and destined to the same destination address. The receiving point must separate the data from the voice. What is needed is a way for a sending point to send both data and voice, and the receiving points to receive separate data and voice.

Second generation systems use digital transmission facilities and provide separate voice and data channels, each designed to the characteristics of the traffic it carries. The destination addresses of the voice traffic and the data traffic are different, however, there is no relationship between the two addresses. In other words, there is no ability to determine the data destination by means of the telephone number dialed for the voice connection. For example, cell phones with Internet access terminate their connection at the ISP, hence, a URL address entered on the telephone serves as an address for the data connection. Thus, the data destination cannot be based on the dialed telephone number. What is needed is a way for the dialed number to be used to determine the data destination.

ISDN (Integrated Services Digital Networks) provide a single physical line that carries multiple channels for voice and data traffic. Each traffic may be destined to a separate address. However, both the data destination and the voice destination must be separately entered. Again, there is no possibility of having a direct relationship between the two destinations. What is needed is a way for the dialed number to be used to determine the data destination.

ADSL (and similarly GPRS) provide much higher digital transmission rates of separate voice and data traffic that share a common twisted pair (mobile channel) facility. Each of the voice and data channels is resilient to the failure of its counterpart. Both voice and data traffic are separately addressed and, if they are destined to the same location, the destination addresses are to be specified separately. This is true for both of the outbound and inbound channels. A data address is independently specified of the termination telephone number. What is needed is a way for the dialed number to be used to determine the data destination.

In sum, current switching systems, though they provide means for carrying voice and data traffic, do not provide mechanisms for linking the destination addresses of the voice and data traffic.

As for terminating equipment, we address conferencing devices, fax machines, and ACD facilities.

Videoconferencing terminals typically use multiple lines to connect to other (similar) terminals. In case the voice and data traffic use one line, the terminals should be able to handle the multiplexing and de-multiplexing of the traffic. Thus, traditional terminals, such as telephones, cannot operate in this mode. Terminals at the end points of a conference need to have homogeneous setup and need to support the same protocols. Devices that provide low resolution videoconferencing are known in the art. Picture phones were shown at the Worlds Fair in 1964.

Such devices require specialized sending and receiving hardware. What is needed is a way to use standard equipment, such as telephones and personal computers, in the home to receive voice and image.

Today, ACD facilities do not allow still pictures to be delivered from the originating telephone with the screen pop. In order to enhance the functionality of such ACDs, a means to accept digital image without having to replace ACD equipment is needed.

In the mobile arena, there are no means today for a mobile shared link to have the data addressed to a destination address that is associated with the called number. Again, mechanisms for linking the destination addresses of the voice and data traffic are needed. For instance, some privacy may be achieved by allowing data address to be predicated on called/calling number. What is needed is a way for the calling number, and called number to be used to determine the data destination.

Thus, prior art is all geared towards using either (1) a single connection to the terminating point for voice and data traffic, or (2) multiple connections to separately-addressed, terminating points.

We now discuss problems with the prior art for integrated voice and data communications. The prior art falls into two categories. Either the voice and data share physical infrastructure with no logical connection whatever, or they are connected, placing a strict dependence for compatible protocols, hardware, and software from sender to receiver. There is a need to overcome this limitation of the prior art.

OBJECTS OF THE INVENTION

An object of this invention is an improved system and method for receiving associated image and voice data.

An object of this invention is an improved system and method for receiving associated image and voice data at call centers.

An object of this invention is an improved system and method for receiving associated image and voice data so that images can be sent by speed dialing a telephone.

An object of this invention is an improved system and method using multiple connections for voice and data with associated destination addresses.

SUMMARY OF THE INVENTION

Our invention is a method, system and business method of enhanced (terminating) telephone numbers which: 1) separates incoming data (e.g., image, streaming video, protocol data) from incoming voice, 2) allows incoming data to be redirected by the telephone company to a data address associated with the telephone number, and 3) forwards the voice to the telephone number. This invention allows existing equipment at the called party (e.g., a plain old telephone, and a personal computer connected to the Internet over a separate line) to receive both voice and data in parallel, potentially over disparate network connections.

A preferred method of the invention facilitates data communication between a data sender and at least one data recipient. The data recipient is associated with a telephone number but cannot be accessed using that number by a sender wishing to send data. The invention receives the telephone number associated with the data destination (data recipient) and receives an indication that data is to be communicated. The invention uses the telephone number to determine by association in a database at least one characteristic of the data destination/recipient. The invention also receives via signaling from the originator or by association in a database at least one characteristic of the data to be communicated that enable the data to be communicated to the data receiver/recipient.

BRIEF DESCRIPTION OF THE FIGURES

The foregoing and other objects, aspects, and advantages will be better understood from the following non limiting detailed description of preferred embodiments of the invention with reference to the drawings that include the following:

FIG. 12A is a block diagram of an example correspondence table, typically at a telephone company.

FIG. 12B is a block diagram of an example speed dial table.

DETAILED DESCRIPTION OF THE INVENTION

A well-established Cellular telephone network exists in most of the planet. This network always carries speech, and many system operators have or will provide for data transport between the Internet and nobile telephones. However, the data functions are always separated from the speech in the land portion of the network, and the addressing of these two aspects is also separate.

Figure 1:
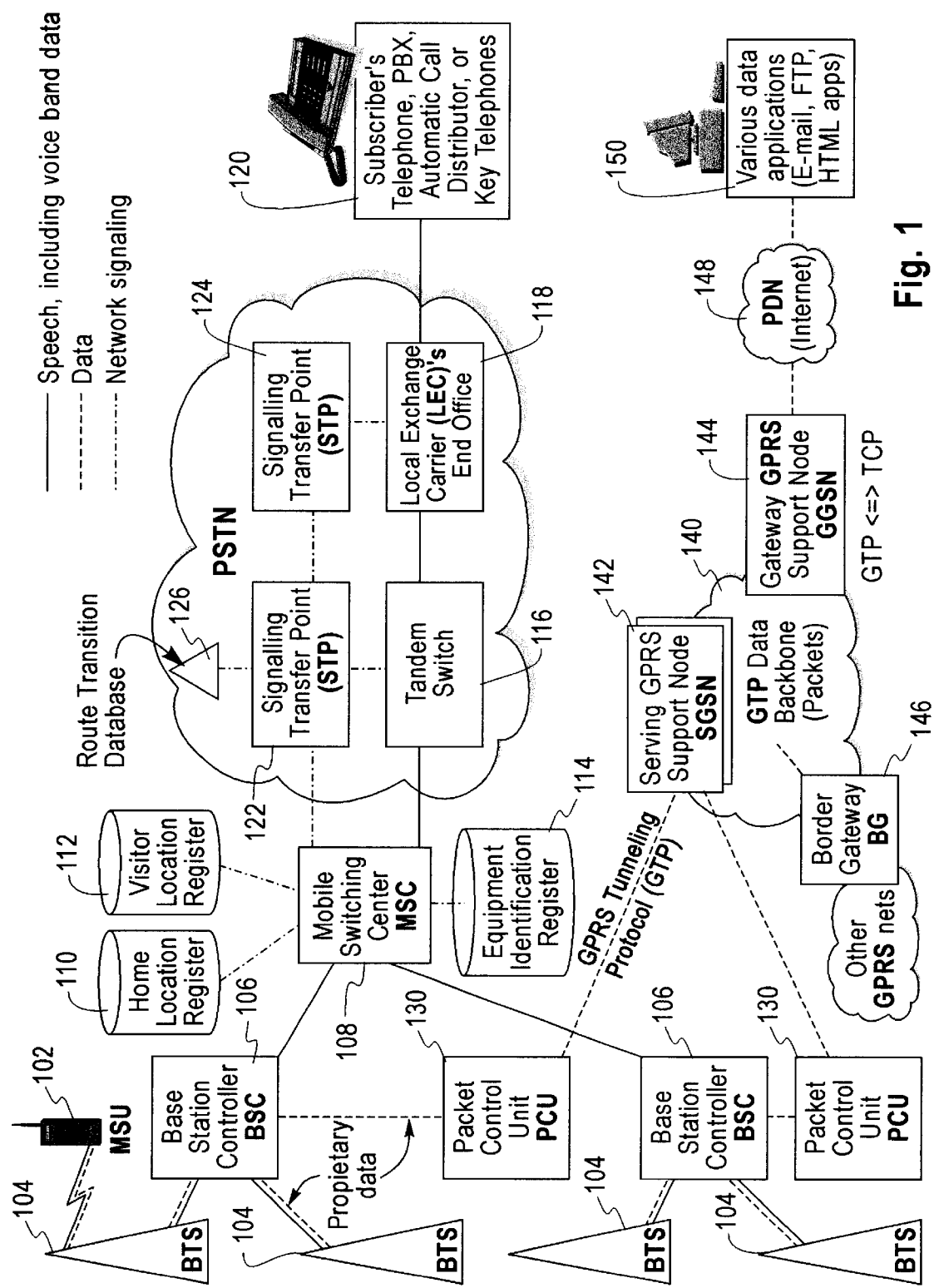
FIG. 1 is a block diagram of a prior art cellular system.

FIG. 1, a typical cellular system, is specifically based on a GSM voice network with GPRS data additions: A mobile user, 102, connects by radio to a nearby Base Transceiver Station (BST), 104, which receives radio signals and places them on land lines to a Base Station Controller, 106. Groups of Base Station Controllers transfer their voice traffic to Mobile Switching Centers (MSC), 108, which are specialized telephone switches capable of switching PSTN connections to appropriate mobile units even if the mobiles move from one Base Station to another. MSCs keep databases such as Home Location Register, 110, which keeps track of the location of all mobiles subscribed to the local mobile operator, the Visitor Location Register, 112, which records mobiles of other operators which are presently in this operator's area, and Equipment Identification Register, 114, which contains serial number and encryption information on mobile subscriber units. When a mobile user initiates a call, the called number is received by the MSC. The MSC communicates with a Route Translation Database, 126, in the Public Switched Telephone Network (PSTN), through one or more Signaling Transfer Points, 122, to obtain a translation (for example if the called number is a toll-free number, it is translated to a normal Listed Directory Number). The MSC uses this translation to establish a voice connection to a PSTN tandem switch, 116, communicating calling and called numbers to the tandem via the signaling network through one or more STPs, 122. The tandem switch uses the same process, possibly through other tandem switches (not shown) and STPs 124, to deliver the call to the Local Exchange Carrier's (LEC) end office switch on which the LDN resides. The LEC end office translates the LDN into a physical connection to the destination subscriber, 120. If the destination contains intelligent equipment such as a PBX or Automatic Call Distributor, the end office may signal to it using the PSTN signaling system, 124. Otherwise it simply rings the telephone. When the subscriber answers, a speech path is established from the mobile unit to the subscriber.

The Mobile Subscriber unit, if so equipped, can also send and receive data. Data could be in the form of an image, JPEG encoded image, video, streaming video, WAV encoded video, MPEG encoded video, REAL encoded video, graphics, or other environmental information. The data is sent in additional time slots in the radio channel so it is actually separate from the speech channel. If the mobile network is equipped for data, each Base Station Controller, 106, will have an associated Packet Control Unit (PCU), 130, which diverts the data stream away from the voice network. From the mobile unit to the PCU, the data format is proprietary to the manufacturer of the mobile equipment. The PCU encapsulates the data using the GPRS Tunneling Protocol (GTP), a standard-based method, and delivers it to the mobile operator's GTP Data Backbone, 140, typically through a router-like Serving GPRS Support Node (SGSN), 142. Data destined for other connected mobile networks may leave through a Border Gateway Node, 146, essentially a GTP router. Data destined for the public data network, the Internet, is converted from GTP to TCP/IP in a Gateway GPRS Support Node (GGSN), 144, and sent to the Internet, 148, for eventual delivery to an Internet user application, 150, such as video display or e-mail.

Hybrid Numbers with Data Over Voice.

A caller may have an instrument which switches from speech-transmission to data-transmission much in the fashion of facsimile machines today. The instrument may be designed to send a file which could represent (but is not limited to) a digitized photograph or a text file. The recipient at the destination telephone number is assumed to have a voice-only connection to the Local Exchange Carrier, and a separate data connection to an Internet Service Provider for access to the Internet.

Figure 2:
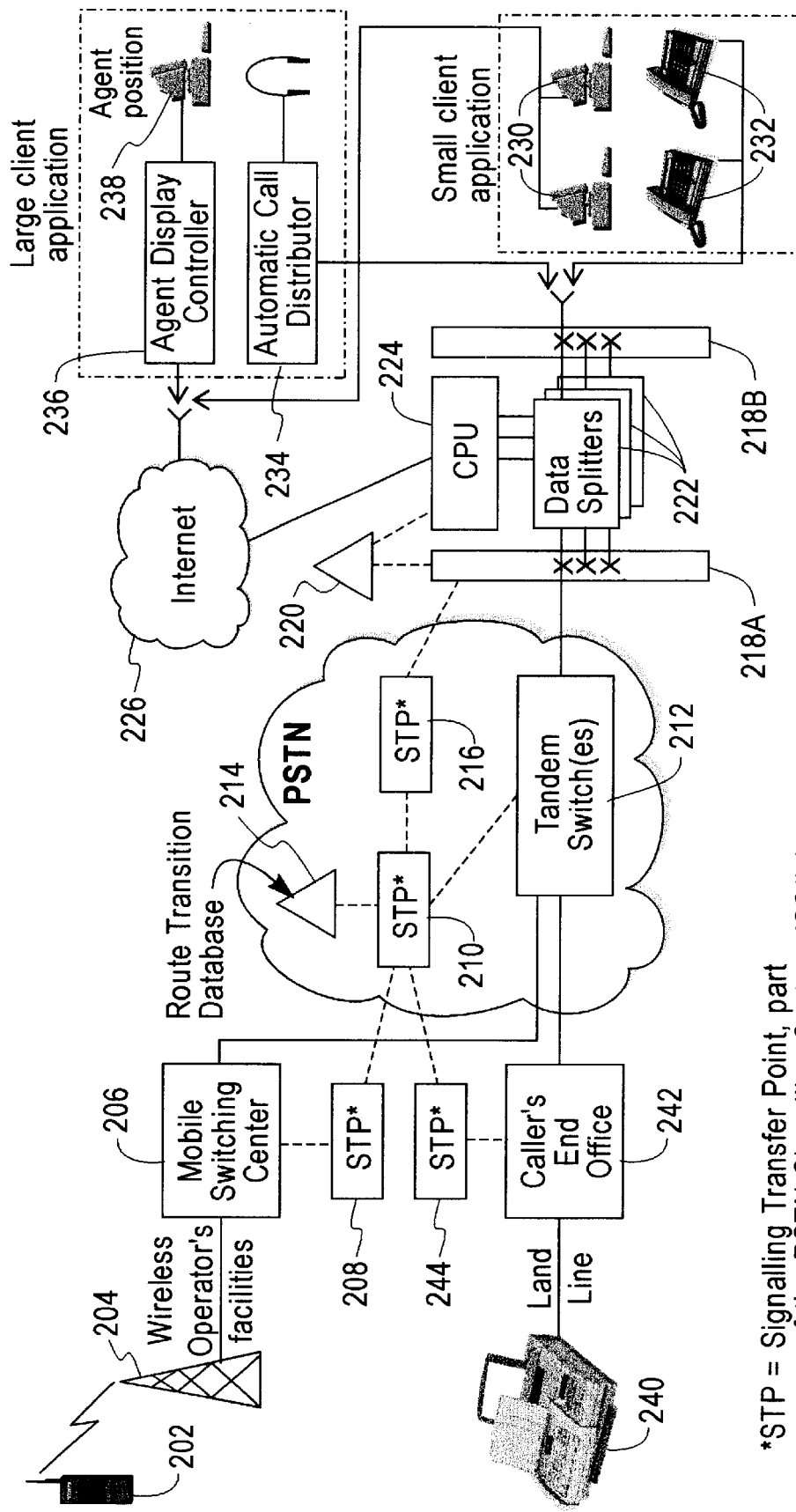
FIG. 2 is a block diagram one preferred embodiment of the present invention showing a split off at the local exchange carrier with a data address.

Referring to FIG. 2, A caller may have a cellular telephone with a video camera, 202, which connects to the Mobile Operator's network via radio to a Base station, 204, and eventually via land lines to a Mobile Switching Center, 206. Alternatively, a land subscriber may have a telephone with facsimile capabilities, 240, which connects to a Local Exchange Carrier's class 5 End Office, 242. In either case, the voice circuit of the subscriber will be connected to a Tandem Switch, 212, in the PSTN. The MSC or end office communicates the subscriber-dialed toll-free number through one or more Signaling Transfer Points, 208, 244, 210, to the Route Translation Database, 214, which will translate the toll-free number into a Listed Directory Number. Prior to this invention, the originating switch, 206, 242, would use the translated LDN to deliver the call through the PSTN to the LEC's client. This invention provides for the toll free number to translate to a LDN which terminates in the incoming side, 218a, of one of a set of voice-data splitters, 222, at a LEC switch, 218. When the circuit is completed through the PSTN via one or more tandem switches, 212, to the LEC's Switch, 218, information flows through the PSTN signaling system, 210, 216, to inform the LEC switch of the intended LDN. The LEC switch translates the incoming number with its database, 220, and determines that the number is a hybrid number. The incoming connection is delivered to the incoming side of one of a pool of voice/data splitters, 222. Using the database, 220, again the voice output side of the voice/data splitter is switched by the LEC switch, 218b, to the client's telephone equipment, either (for large clients) to a PBX or automatic call distribution system, 234, or (for small clients) an incoming line on a group of multibutton telephone sets, 232. At this point the caller may speak with an agent at the client location. Should the caller send data (e.g. video, fax data) the data splitter will recognize the transition from speech to data either by a signal tone or by a change in the spectral characteristic of the signal, and divert the data to a processor, 224. The processor accumulates the data into a file. Simultaneously, the processor accesses the local database, 220, to obtain the data address associated with the incoming LDN. When the file is complete the processor will deliver it to the Internet, 226, addressed to the client's data address. Smaller clients may have agent terminals, 230, that are simple workstations with Internet access. The agent would use his/her browser to access the incoming file and read or display it. Larger clients may have display controllers (e.g. IBM CallPath systems), 236, to coordinate displays as calls are assigned and subsequently reassigned to various agents, 238. The display controller knows the origin of the voice call because it was passed to the ACD when the voice call was set up, and can use this to associate the voice call with the calling number in the file delivered via the Internet. Thus the data screen can be moved from agent to agent in synchronization with the voice circuit.

Figure 3:
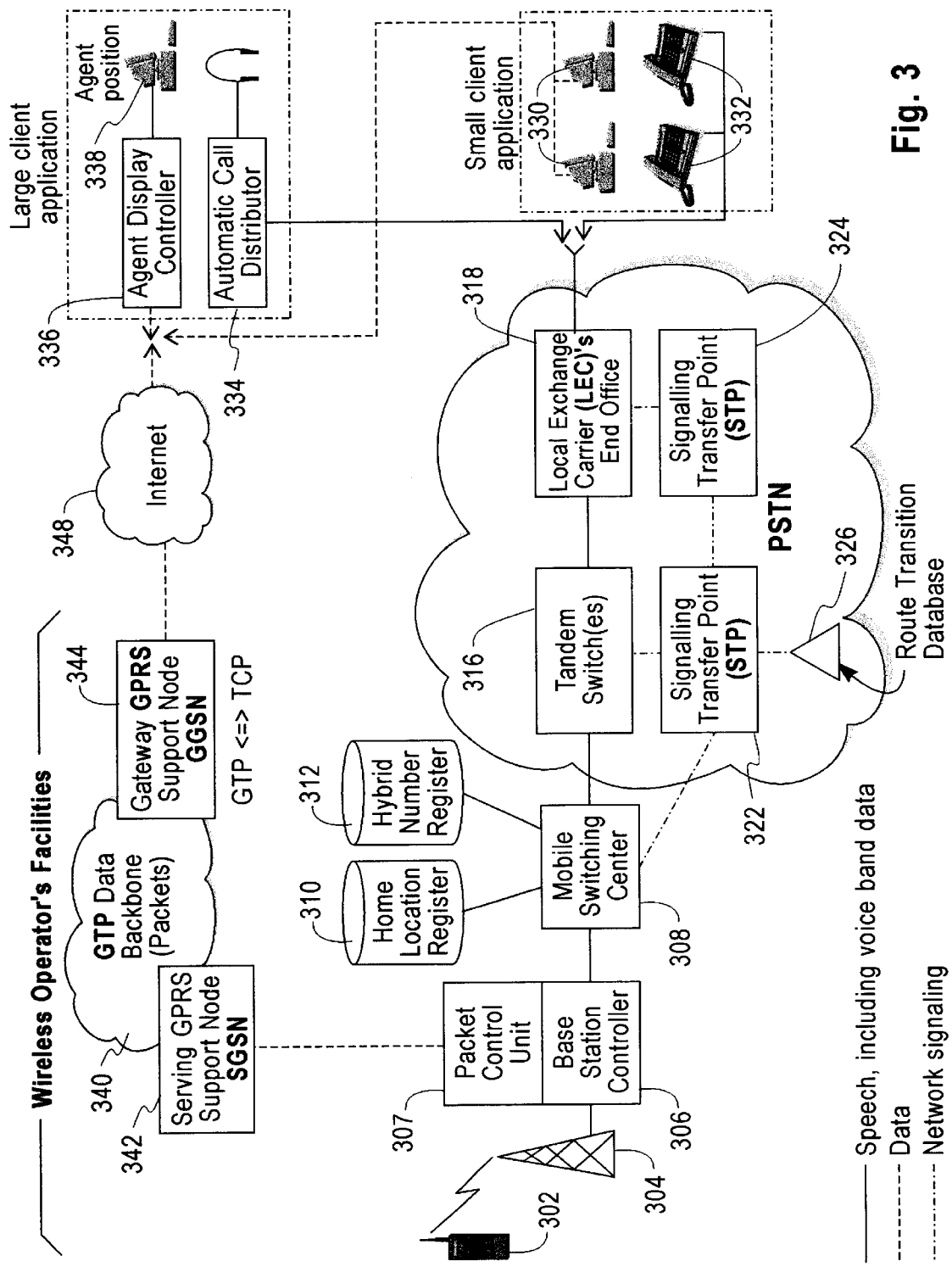
FIG. 3 is a block diagram of one preferred embodiment of the present invention showing a split off at the cellular carrier.

Referring to FIG. 3, a caller may have a cellular telephone with a video camera, 302, which connects to the Mobile Operator's network via radio to a Base Station, 304, and then to a Base Station Controller (BSC), 306. When the subscriber initiates a voice call the Base Station Controller establishes a circuit via land lines to a Mobile Switching Center (MSC), 308, and relays the subscriber-dialed number to the MSC. The MSC checks its Hybrid Number Register, 312, (a database) to determine if the subscriber has dialed a hybrid number. If the number is hybrid, the Hybrid Number Register will return a data address to which any data transmissions that occur during the voice call should be sent. The MSC transmits the data address back to the Packet Control Unit, which saves the address to use if a video transmission should occur during the voice call. If the called number is not a hybrid number, the MSC sends nothing to the Packet Control Unit 307, which continues normal operation (for example, the mobile unit may have web browser capability which runs whether or not a voice call is in progress). In either case the MSC continues a normal call setup: The MSC will establish the voice portion of the call by communicating the subscriber-dialed toll-free number through one or more Signaling Transfer Points, 322, to the Route Translation Database, 326, which will translate the toll-free number into a Listed Directory Number (LDN). If the dialed number is not toll-free the number is already a Listed Directory Number so this translation step is skipped. The voice circuit of the subscriber will be connected through one or more Tandem Switches, 316, in the PSTN, to the Local Exchange Carrier (LEC) Switch, 318. Call setup information flows through the PSTN signaling system, 322, 324, to establish the circuit and to inform the LEC switch of the intended LDN. The LEC switch translates the incoming number to a physical connection and completes the connection to the client's telephone equipment, either (for large clients) to a PBX or automatic call distribution system, 334, or (for small clients) an incoming line on a group of multibutton telephone sets, 332. At this point the caller may speak with an agent at the client location.

Should the caller send data (e.g. video) the Base Station Controller, 306, will recognize it in various ways depending on the particular data system the mobile operator has implemented, and divert it to the Packet Control Unit, 307. The Packet Control Unit will organize the incoming data into a file, for example an image file if from a video camera, and will add the caller's telephone number to the file's metadata so that the destination user may identify the file as one among many from different callers. Alternatively, the Packet Control Unit may stream the incoming data to another server, 342 on the carrier's data backbone, 340, to perform file organization remotely. Depending on the system implementation, the data arriving from the mobile unit may have a destination data address, or the Packet Control Unit may be designed to provide the address. In either case, if the Packet Control Unit has received a data address from the MSC, it will substitute the data address for any other IP address, and will deliver packets via the wireless operator's GTP data backbone network, 340, 342, 344, to the Internet, 348, addressed to the hybrid number client's data address. Smaller clients may have agent terminals, 330, that are simple workstations with Internet access. The agent would use his/her browser to access the incoming file and read or display it. To identify the incoming file as one among many, the agent's terminal application will use the calling number imbedded in the file by the PCU or server. Larger clients may have display controllers (e.g. IBM CallPath systems), 336, to coordinate displays as calls are assigned and subsequently reassigned to various agents, 338. The display controller knows the origin of the voice call because it was passed to the ACD, 334, by the local central office, 318, when the voice call was set up, and can use this to associate the voice call with the calling number in the file delivered via the Internet. Thus the data screen can be moved from agent to agent in synchronization with the voice circuit.

The next figures describe how data is directed to data addresses. Data addresses can be e-mail addresses, web addresses or IP addresses. Those with Internet access commonly have e-mail, and therefore e-mail addresses to which such data can be sent. IP addresses are used for those who may be permanently or currently connected to the Internet, with a single access point. These can be used to send data to a Sametime or Instant Message application, or as a file transfer. Web addresses may be used more often by businesses providing enhanced 800 number service. These are used so that the data may be pushed to a web address by the caller, or service provider, and pulled from the web address by a representative of the business (such as an operator, or customer service representative). Note that in this last case, multiple business employees may have simultaneous access to the data. This allows an operator to see the data, and an operator supervisor to concurrently view the data in concert with the voice call. While the following description focuses on images, this invention allows the delivery of any form of data, including streaming media. Examples of data so provided may include environmental measurements, medical data, faxed data, etc.

The data can be sent to the data addresses in one of two ways. In the first, the service provider (either the LEC or the cellular provider) splits off the data and directs it to the appropriate address. In the second method, the service provider ascertains the appropriate address, returns the address to the calling party, and thereby allows the calling party to directly send the data to the appropriate address. This latter method is used to deliver streaming media, and in this case, an IP address is the data address used. In a preferred embodiment, a transcoding step may be performed at the service provider to present the data in an appropriate format. This may be standard transcoding, based on agreement with the calling party, and perception of the data type, or may be based on agreement with the called party.

Figure 4:
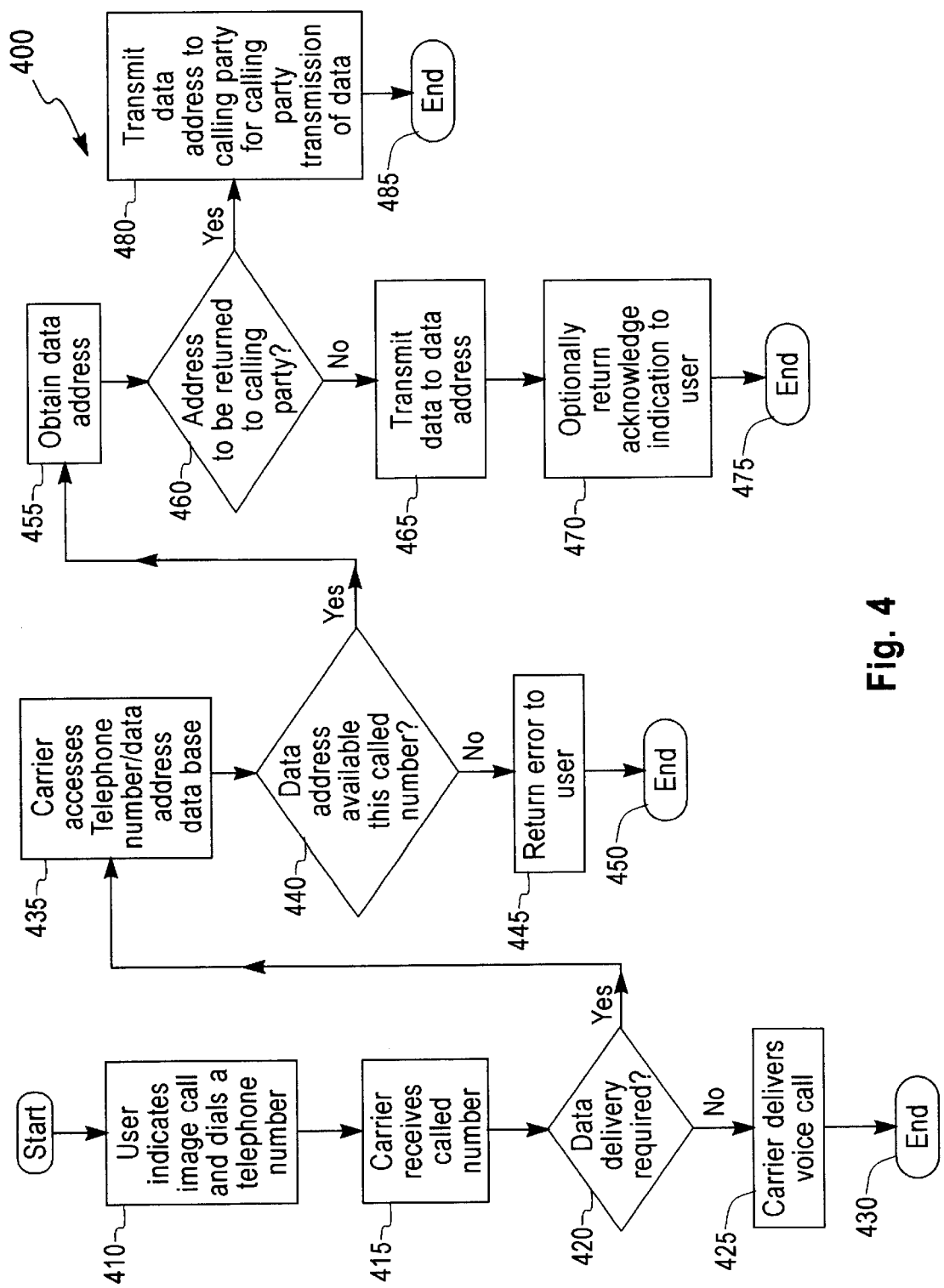
FIG. 4 is a flow chart of a data address process that directs data to the correct data address.

FIG. 4 describes an example of a process used to direct the image to a data address. In block 410, the user indicates that an image call is desired, and dials the telephone number associated with the recipient. This may be an 800 number, a home or cellular number, or any other addressable number with this service. In block 415, the carrier receives the number dialed. Note that the carrier in block 415 may be the cellular carrier (as shown in FIG. 3), or may be the receiving local exchange carrier (as shown in FIG. 2). In block 420 the carrier checks to see if data delivery is required; if no data delivery is required, the call is completed as a traditional voice call in block 425, and the process ends in block 430. If the decision in block 420 was that data was required, the carrier accesses the database containing the telephone number/data address mapping. In an alternate embodiment, this can be calculated algorithmically for example from the called number, or from data associated with the called number. In block 440, we determine whether a data address is available for this called number. If no data address is available then in block 445 we return an error indication to the calling party/user. Note that the error indication can be relayed to the user in a variety of ways such as interrupted dial tone, flashing lights, text error messages, vibratory alerts, etc. If in block 440, we determined that a data address was available we proceed to obtain it in block 455.

We proceed to block 460 where we check on whether the address is to be returned to the calling party. If the answer is yes, then in block 480 we transmit the data address back to the calling party so the calling party can directly transmit the data to the correct data address. In this case we end the process in block 485. If in block 460 we had determined that the address was not to be returned to the calling party, we proceed to block 465 and transmit the data to the data address. See FIG. 5 for a detailed flow of how this data transmission can be accomplished, in one preferred embodiment. Once the data has been transmitted we may return an acknowledgment indication to the user in block 470. This acknowledgment may be represented to the user as a light, audible indicator, interrupted tone, text message, icon, and so on.

Figure 5:
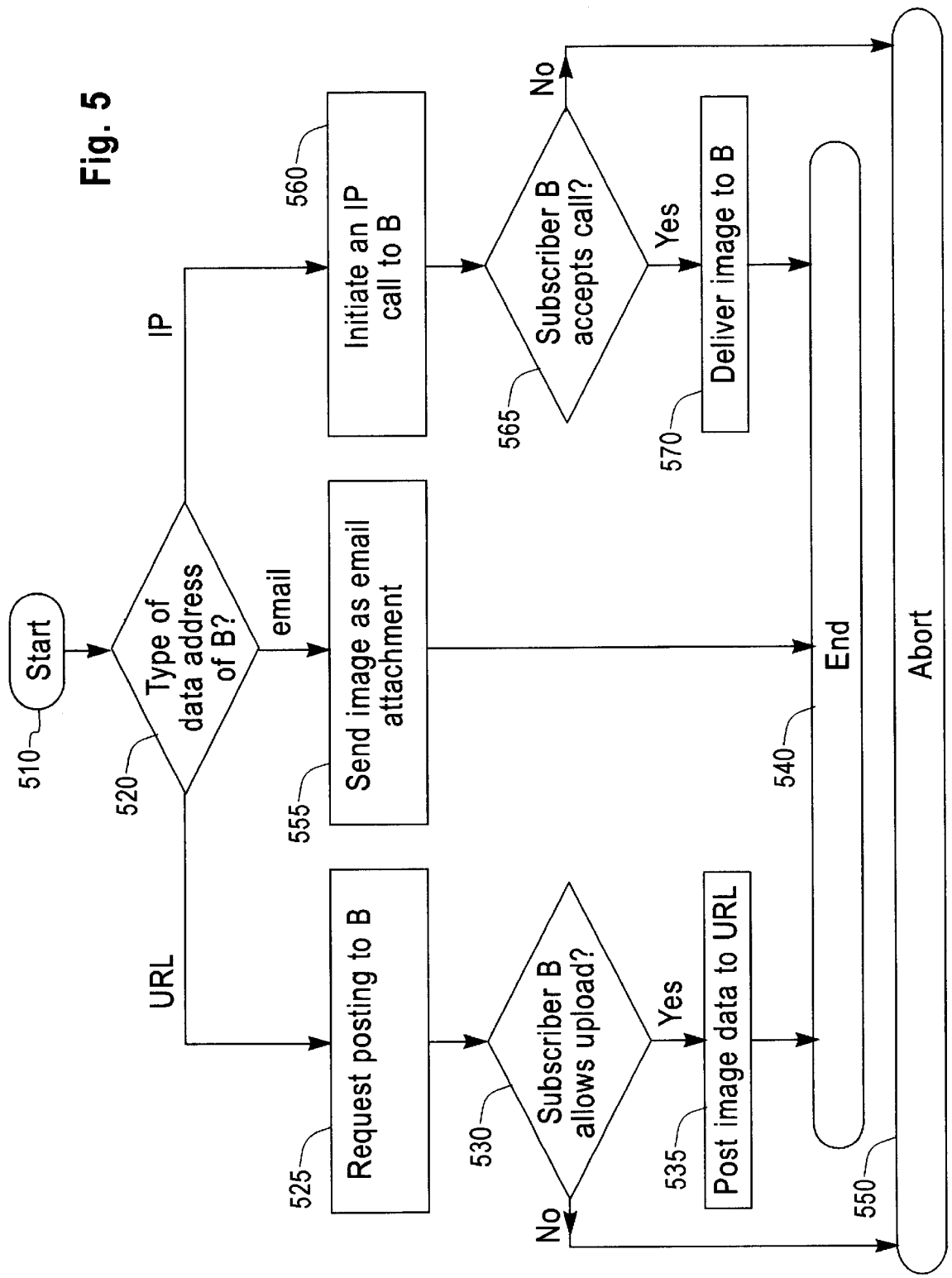
FIG. 5 is a flow chart of a transmit data process that transmits data to a data address.

FIG. 5 describes the flow for the transmission of data to a called party B with a data address. Upon receiving a request for data transmission, the algorithm starts, 510, to process the request. In 520, the type of data address of the called party B is identified. There are three possibilities: a URL where the data is to be posted, an e-mail address where the data is to be sent as mail, and an IP address where a data IP call is to be initiated. In the first case, 525, a post request is made to the URL of B. If subscriber B has allowed uploading of data, 530, then the posting of data follows, 535, and B should be able at a later time to get the data. In some embodiments, such uploads are allowed for all callers. This ends the operation, 540. Otherwise, the operation is aborted, 550. In the case of e-mail, the data is attached to an e-mail and sent to B, 555. Finally, if the data address of B is an IP address, then an IP call is initiated to B, 560. If B accepts the call, 565, then the image data is delivered, 570, otherwise the operation is aborted, 550.

Figure 6:
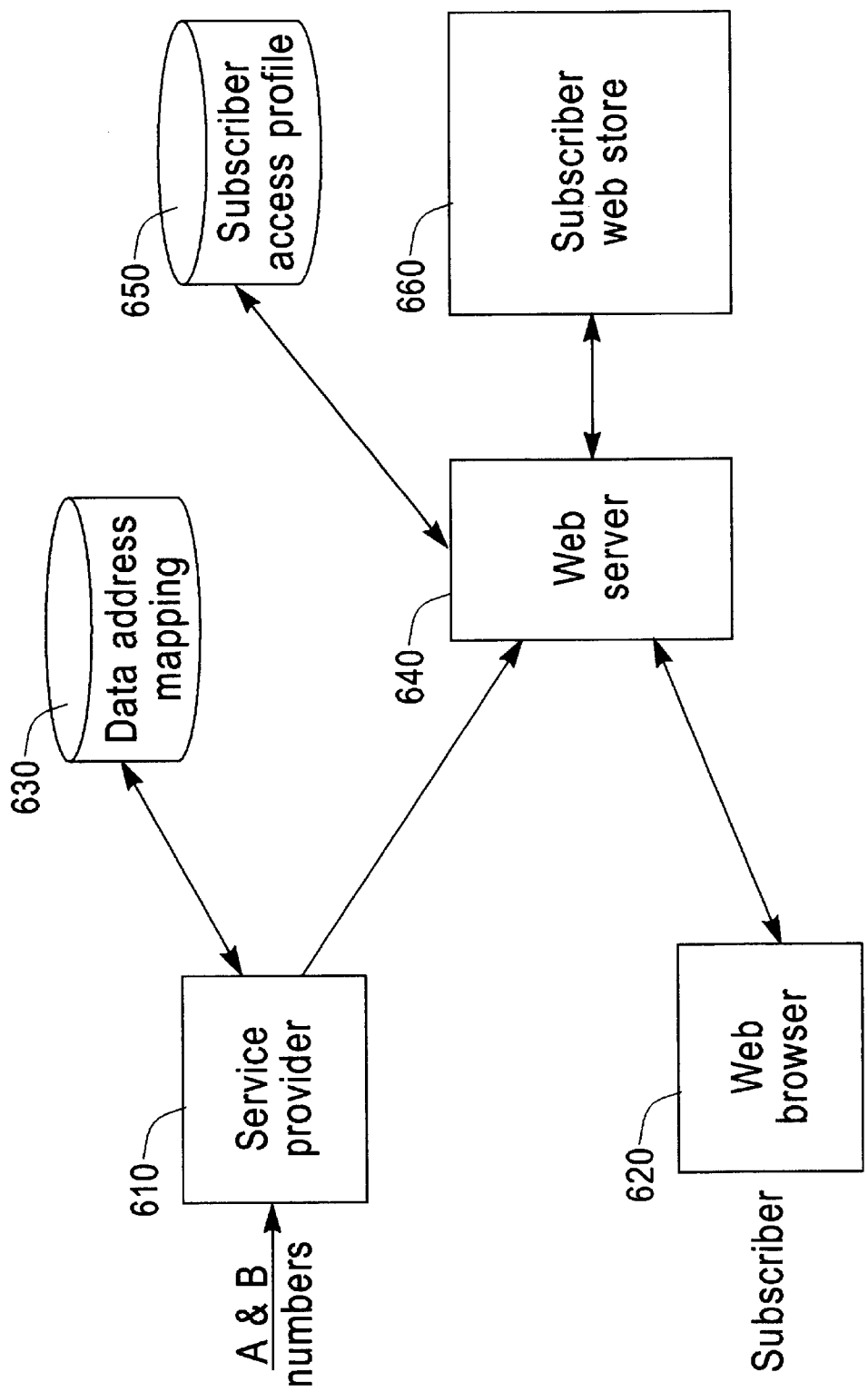
FIG. 6 is a block diagram showing data being pushed to a web address.

The system configuration for pushing data to a web address is provided in FIG. 6. The service provider, 610, receives the numbers for the calling party (A) and the called party (B). The service provider maintains a data base, 630, for the address translation from a B number to web address (URL) for B. Then, the service provider accesses the web address of B through a web server, 640, that will consult a data base, 650, where subscriber B specifies the access profile, that is the read and write access rights for the web store of B, 660. To access the data stored in the web store, subscriber B uses a web browser, 620. In the case where B is a business, no restrictions on data upload access may be placed.

Figure 7:
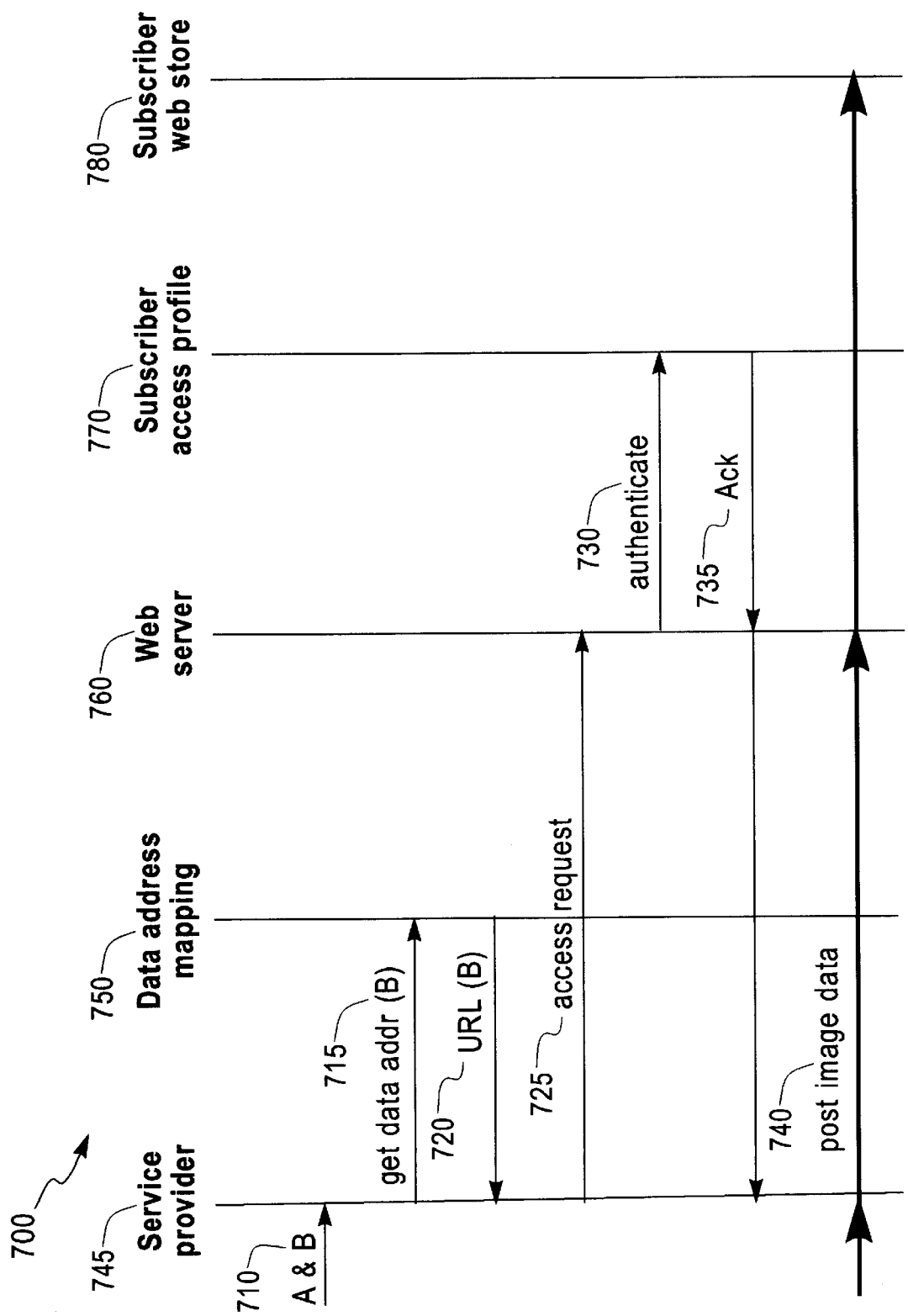
FIG. 7 is a diagram showing flow for pushing data to a web address.

A flow diagram of pushing data to a web address is depicted in FIG. 7. Following a request from calling party A to initiate a data transfer to called party B, the service provider, 745, receives the address numbers of both A and B, 710. The service provider, 745, issues a request, 715, to retrieve the data address of B from the data address mapping data base, 750. In this case, a web address (URL) for B, 720, is returned to the service provider, 745. The latter issues a request to the web server, 760, in order to access the web store of subscriber B, 780. The web server, 760, consults the access profile of subscriber B, 770, by sending an authentication request, 730, asking if party A has the right to upload data to the web store of B, 780. If granted, an acknowledgment, 735, is sent back to the web server, 760, and to the service provider, 745. The latter then initiates the posting operation of the image data, 740, to the web store of subscriber B, 780, through the web server, 760.

Figure 8:
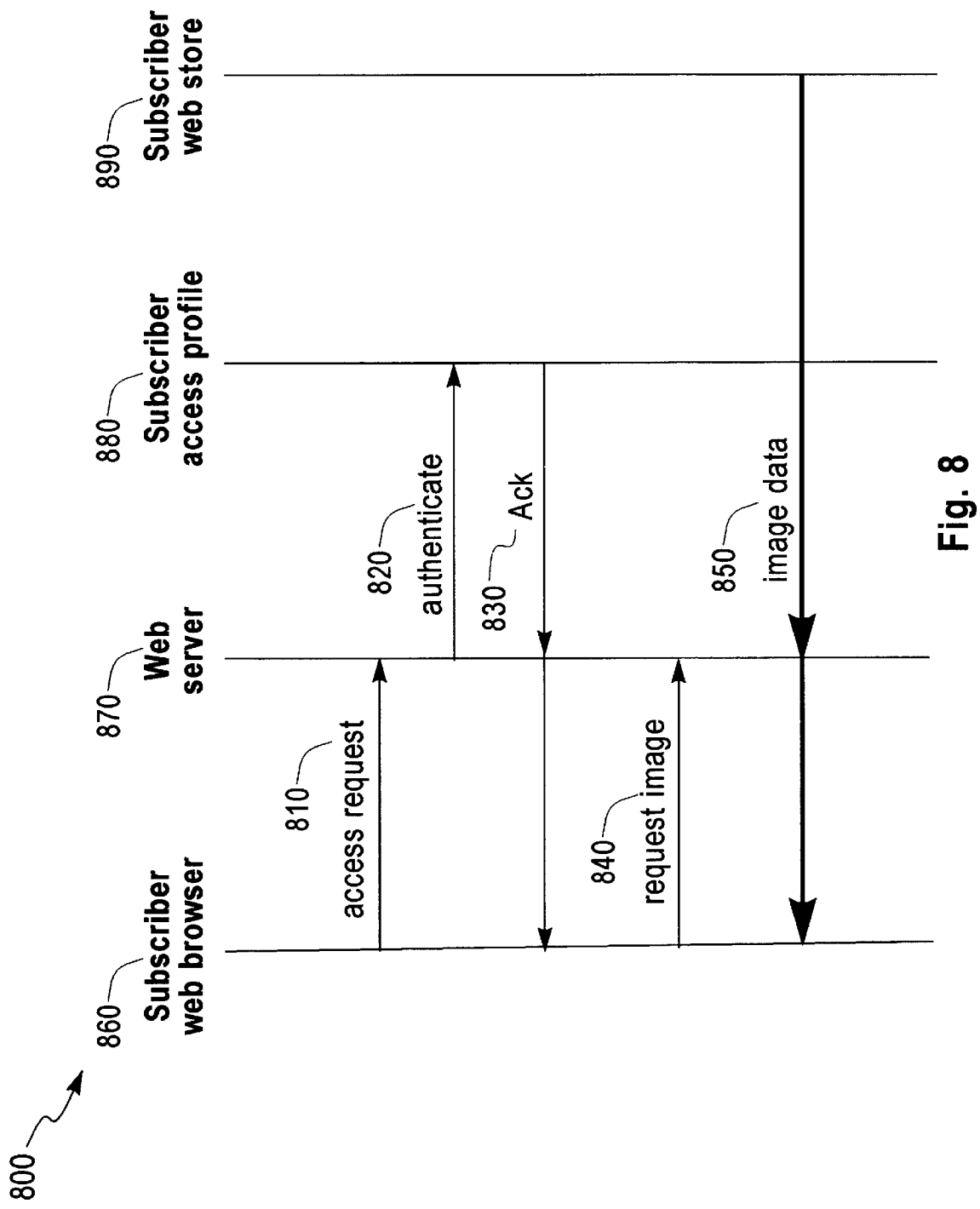
FIG. 8 is a diagram showing a subscriber (e.g., an operator) process to retrieve data from a web address.

Once the data is pushed to a web address, subscriber B may retrieve the data by going to that web address. FIG. 8 illustrates the flow of retrieving data from a web address. The subscriber uses a web browser, 860, to send an access request, 810, to the corresponding web server, 870. In turn, the web server, 870, sends an authentication request, 820, to the subscriber access profile, 880, in order to validate access rights of the requester B. If granted, an acknowledgment, 830, is sent back to the web server, 870, and the subscriber web browser, 860. Now, the subscriber requests the image data by sending a request, 840, from the web browser, 860, to the web server, 870. The latter, having access to the subscriber web store, 890, causes an image data transfer, 850, to the subscriber web browser, 860, through the web server, 870.

Figure 9:
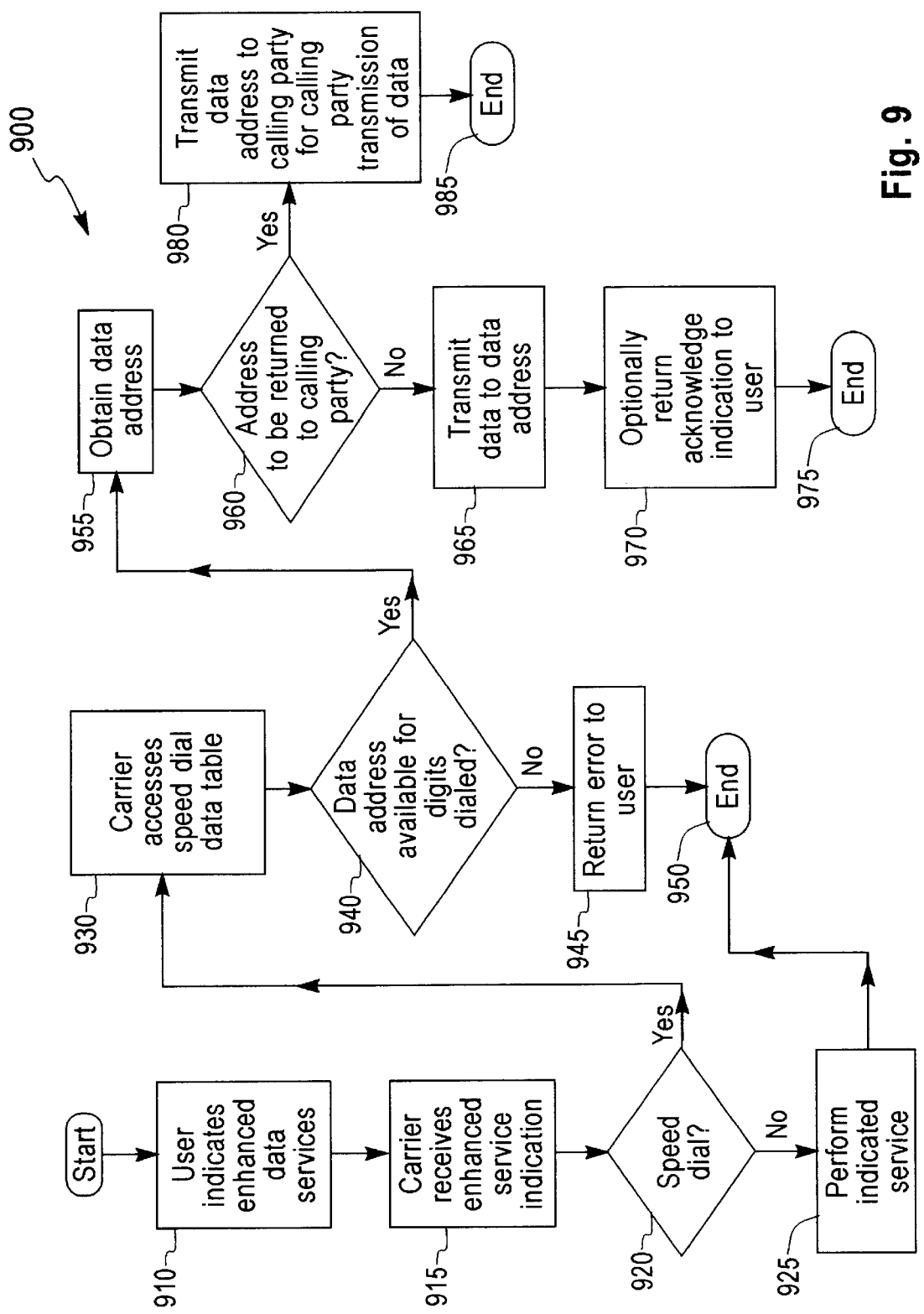
FIG. 9 is a flow chart showing a speed dial process with enhanced data services.

FIG. 9 describes an exemplary process for enhanced data services; in particular for speed dial. In this figure, in block 910 the user indicates that enhanced data services are desired. In one embodiment, the user dials digits indicating which enhanced data service is required. In block 915, the carrier receives the indication, and in block 920 determines whether data speed dial is the service required. If it is not, in block 925 the carrier performs whatever service has been indicated, and in 950 the process ends. If the decision in block 920 was that speed dial is required, the carrier accesses the speed dial data table for this user (block 930), and validates that a data address is available for the digits dialed (block 940). If this is not true, then in block 945, the carrier returns an error to the user. Note that the error indication can be relayed to the user in a variety of ways such as interrupted dial tone, flashing lights, text error messages, vibratory alerts, etc. If an address is available, then in block 955 we obtain the address.

We proceed to block 960 where we check on whether the address is to be returned to the calling party. If the answer is yes, then in block 980 we transmit the data address back to the calling party so the calling party can directly transmit the data to the correct data address. In this case we end the process in block 985. If in block 960 we had determined that the address was not to be returned to the calling party, we proceed to block 965 and transmit the data to the data address. See FIG. 5 for a detailed flow of how this data transmission can be accomplished, in one preferred embodiment. Once the data has been transmitted we may return an acknowledgment indication to the user in block 970. This acknowledgment may be represented to the user as a light, audible indicator, interrupted tone, text message, icon, and so on. The process then ends in block 975.

User Interface

Figure 10:
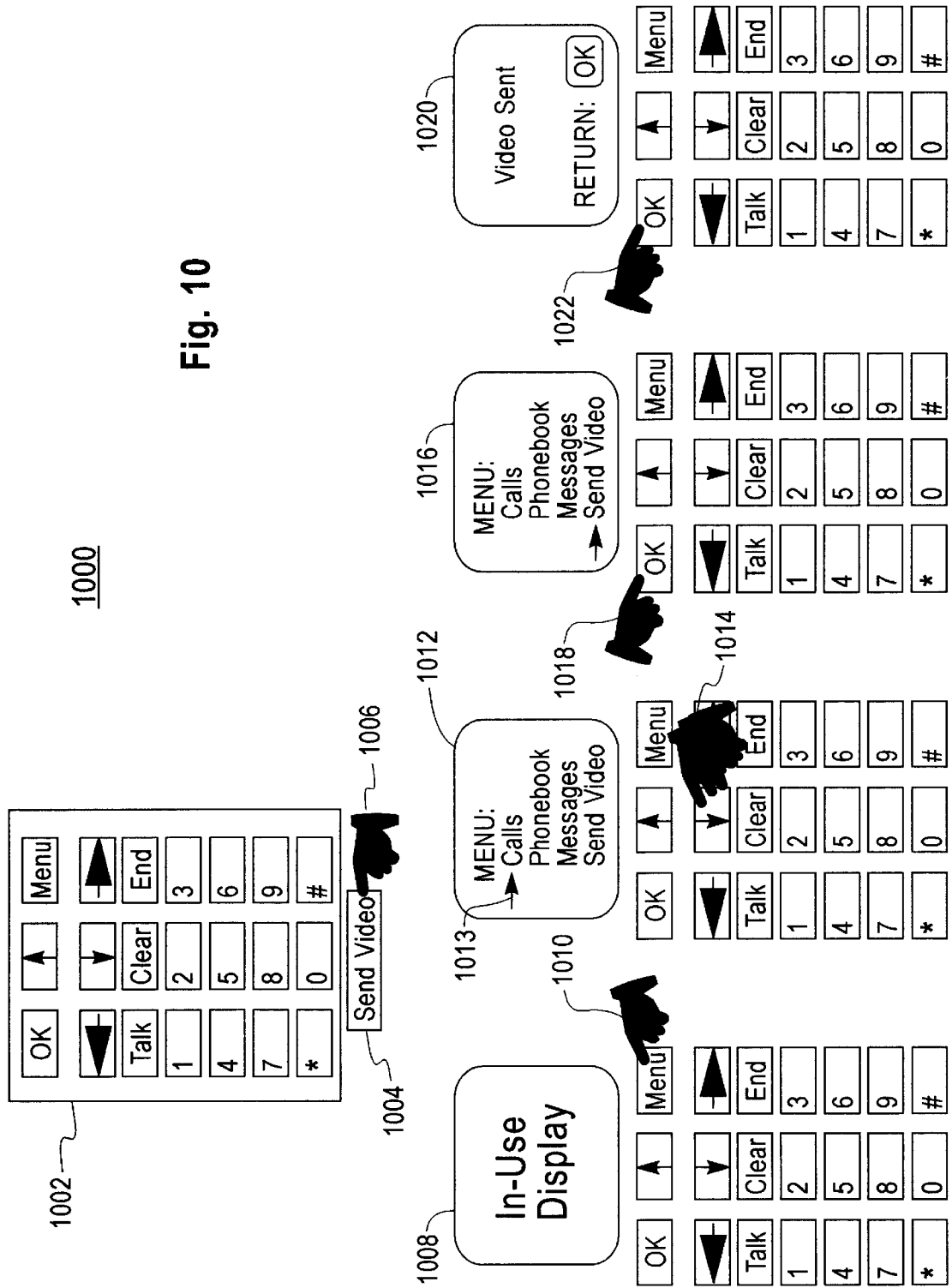
FIG. 10 is a block diagram of a user interface.

Depending on the manufacturer's implementation a mobile user may use the built-in video camera to take a picture either before or after the voice call begins. After a customer has dialed a hybrid telephone number the user interface is employed to accomplish the transmission. Two embodiments are shown in FIG. 10; other embodiments are possible. One preferred method is to include a "Send Video" key, 1004, shown added to a typical keypad arrangement, 1002. The user, 1006, presses the "Send Video" key at the appropriate time.

Because keypad space is at a premium in mobile telephones, a dedicated key is not always possible. Another embodiment of the interface, shown in the remainder of FIG. 10 (items 1008–1022), requires no additional keys beyond those already in all mobile telephones.

While the mobile user is talking, some standard "In use" display, 1008, is shown in the mobile unit display, often containing the called number and the elapsed time of the call. To use this interface, the user selects the "Menu" key, 1010, which causes a list of functions to appear in the display, 1012. One of the items in the list is indicated or highlighted, 1013, which will be the function implemented should the OK key be pressed. In the example, "calls" is indicated by the arrow, so the user presses the "down" key three times, 1014, to move the indicator down to "send video", 1016. The user presses the OK key, 1018, indicating that the selected function, "send video", is to be implemented. This causes the mobile unit to send the video file and triggers actions in other parts of the mobile telephone system as described in the other figures. Because data rates available to mobile telephones are not great compared to the size of a video file, it may be useful to provide feedback to the user indicating when the transmission is complete. After the video file is transmitted, the mobile unit may indicate completion with a message on the display, 1020. The user typically presses the OK key, 1022, to return to the in-use display, 1008.

Figure 11:
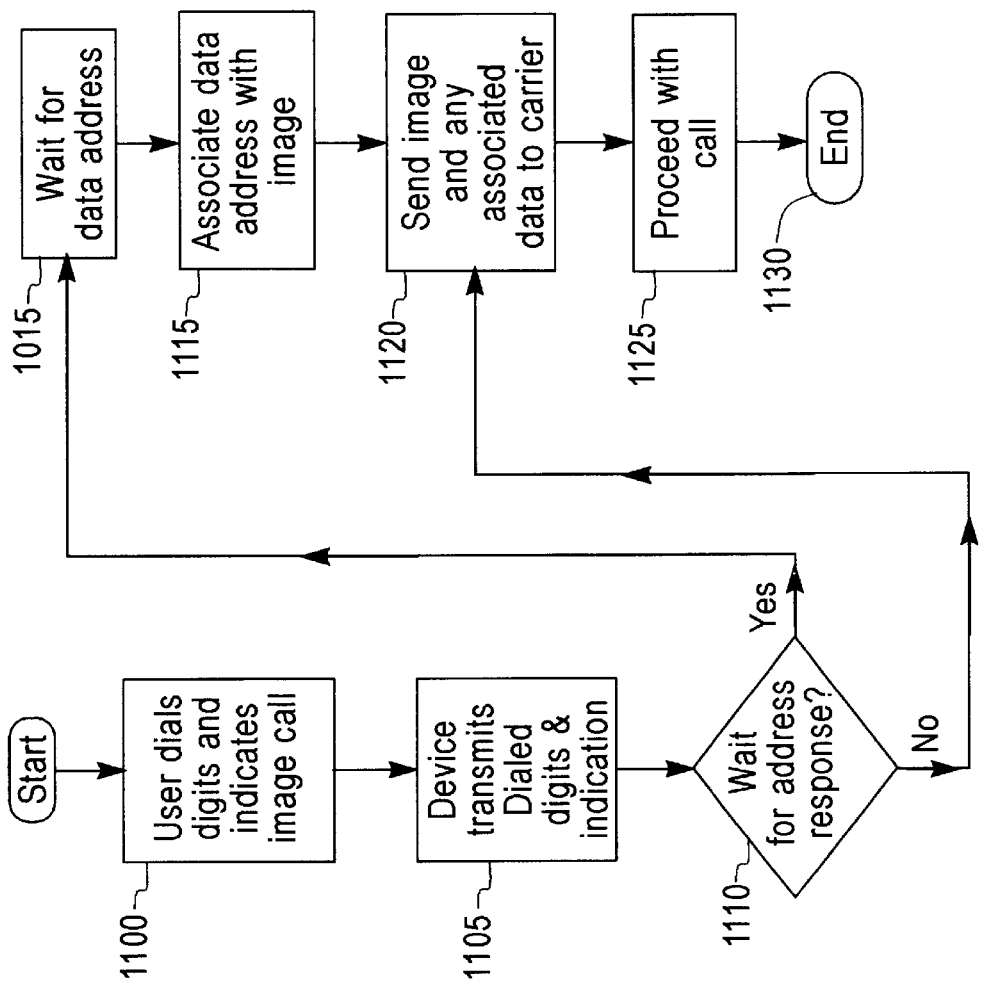
FIG. 11 is a flow chart of a calling party process.

FIG. 11 shows the process from the calling party perspective. In FIG. 11, block 1100, the user dials the called party digits and indicates that this is an image call. Note that the opposite order is equally supported by this invention, as is the indication of an image transmission during a connected call. See FIG. 13 for the description of the process during a call. In block 1105, the digits and indication are transmitted to the carrier. A determination is made in block 1110 as to whether a data address should be received back from the carrier. In some embodiments, the data address is received at the device, and the device then transmits to the precise address desired any image data. If the decision in block 1110 is that a data address is expected, then in block 1015 we wait for the data address to be received. Once it has been received, we associate the address with the outbound image in block 1115, and proceed to a sending step in block 1120.

If no data address was expected in as a result of the decision in block 1110, we proceed directly to block 1120. In block 1120 we send the image and any associated address data to the carrier, and in block 1125 we proceed with the voice call. In block 1130, the process ends.

FIG. 12A shows an example of a correspondence table between called telephone numbers and data addresses. As obvious to anyone skilled in the art, this example is merely one of a number of correspondence schemes that may be used, and relies on a match of called number with the telephone number in the first field. In FIG. 12A, the field 1280 represents the called number, and the field 1290 represents the data address associated with that called number. In order to determine if data delivery is required (FIG. 4, step 420), the carrier may examine the table to determine if a valid entry is present in the associated field 1290 for that called number. Entry 1210 shows the local number 555-0000 and the associated data address, in this case an e-mail address at AOL. Entry 1220 shows a web address to be used to calculate a destination address. Entry 1249 shows an IP address for the destination. The IP address may be permanently assigned, and the table therefore fairly stable, or may be dynamic. If dynamic, the assignment would require rapid and frequent update. Note that the assignments may be kept at the carrier, or at an appropriate service provider who can update the assignments at an appropriate rate. Entry 1270 shows multiple addresses; this party may desire that images be sent to all three addresses. In other embodiments, the address selected may depend on recipient profiles and policies; e.g. during working hours, images may be delivered to a work address.

FIG. 12B shows an example speed dial table for data. In this example, all entries are associated with speed dial for a single subscriber. *code 1 will result in images being sent to mom@aol.com, *code2 to dad@earthlink.net, and so on. A different set of entries is kept for each subscriber.

Figure 13:
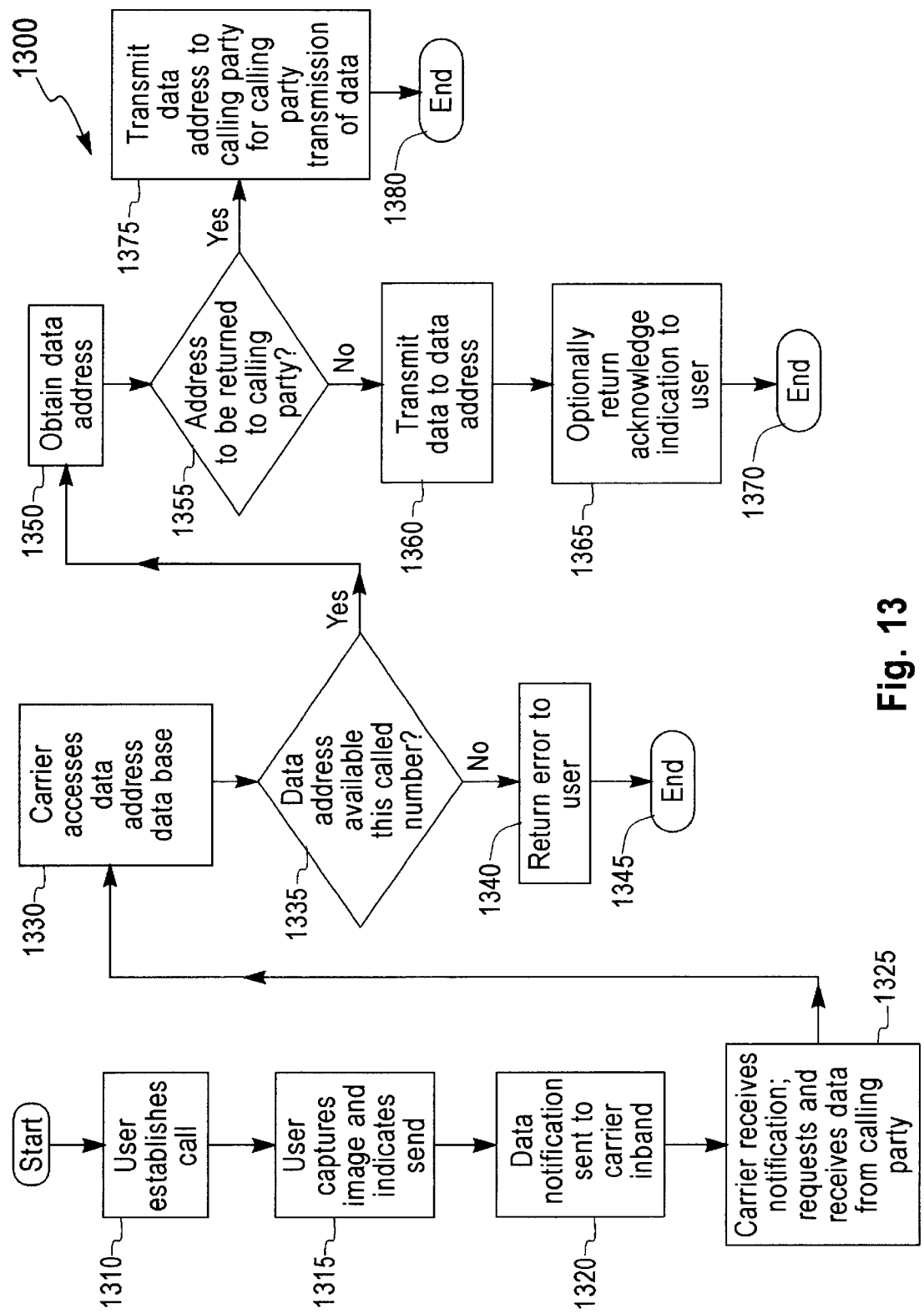
FIG. 13 is a flow chart of an image sending process for sending an image during a call.

FIG. 13 describes an example of a process used to send an image during a call. direct the image to a data address. In block 1310, the user establishes the voice call. This may be a call with an 800 number, a home or cellular number, or any other addressable number with this service. In block 1315, the user elects to take an image and indicates that he or she wishes to transmit the image to the data address associated with the called number. In block 1320, this notification is sent to the carrier. The notification request may be transmitted via in-band signaling in a telephone network voice channel, DTMF tones, signaling outside of a telephone voice channel, ADSL, wireless communication, wireless command channel communication, or a voice command. In block 1325, the carrier receives the request, and then gets the data from the calling party. In block 1330 the carrier access the data address tables for this called number, and in 1335 checks to see if a data address is available for this called number. If no data address is available then in block 1340 we return an error indication to the calling party/user. Note that the error indication can be relayed to the user in a variety of ways such as interrupted dial tone, flashing lights, text error messages, vibratory alerts, etc. If in block 1340, we determined that a data address was available we proceed to obtain it in block 1350.

We proceed to block 1355 where we check on whether the address is to be returned to the calling party. If the answer is yes, then in block 1375 we transmit the data address back to the calling party so the calling party can directly transmit the data to the correct data address. In this case we end the process in block 1380. If in block 1355 we had determined that the address was not to be returned to the calling party, we proceed to block 1360 and transmit the data to the data address. See FIG. 5 for a detailed flow of how this data transmission can be accomplished, in one preferred embodiment. Once the data has been transmitted we may return an acknowledgment indication to the user in block 1365. This acknowledgment may be represented to the user as a light, audible indicator, interrupted tone, text message, icon, and so on.

The description of the present invention has been presented for purposes of illustration and description, and is not intended to be exhaustive or limited to the invention in the form disclosed. Many modifications and variations will be apparent to those of ordinary skill in the art. Although the depicted illustrations show the mechanism of the present invention embodied on a single server, this mechanism may be distributed through multiple data processing systems. The embodiment was chosen and described in order to best explain the principles of the invention, the practical application, and to enable others of ordinary skill in the art to understand the invention for various embodiments with various modifications as are suited to the particular use contemplated.

We claim:

1. A method of facilitating data communication between a data sender and at least one data recipient, said data recipient associated with a telephone number but not accessible through a telephone call to said number, said method comprising:

receiving a telephone number associated with the data destination;

receiving an indication that data is to be communicated;

using said telephone number to dynamically determine at least one characteristic of said data destination; and enabling the data to be communicated to said data recipient based on said at least one characteristic of the data destination and based on the data to be communicated.

2. The method of claim 1 further comprising:

receiving at least one characteristic of the data to be communicated.

3. The method of claim 1 where the indication received includes one or more of the following:

in-band signaling in a telephone network voice channel, DTMF tones, signaling outside of a telephone voice channel, ADSL, wireless communication, wireless command channel communication, and a voice a command.

4. The method of claim 1 where said determining at least one characteristic of said data destinations includes at least one of the following:

accessing a data base and communicating with said data destination.

5. The method of claim 1 where said characteristic of said data destination includes at least one of the following:

an IP address, an e-mail address, a URL, a data receiving application, an address of data receiving application, one or more parameters of data receiving application, an indication of recipient membership in a call center, and an indication of recipient use of an automated call distributor.

6. The method of claim 2 where said characteristic of the data to be communicated includes one or more of the following:

one or more data types, an image data type, a streaming video data type, a protocol associated with said data, a data rate.

7. The method of claim 1 where said enabling includes at least one of the following:

a transcoding of the data, a communication with said data destination, an access of a database.

8. The method of claim 1 where said enabling includes sending one of the following to the sender:

an IP address, an e-mail address, a URL, an address of data receiving application, one or more parameters of a data receiving application, an indication of recipient membership in a call center, an indication of recipient use of an automated call distributor.

9. The method of claim 1 further including voice communications over a telephone network including a telephone associated with said telephone number.

10. The method of claim 9 where the telephone number is a toll free number.

11. The method of claim 9 where at least some of the communicated data is displayed on a display that is physically proximate to said telephone associated with said telephone number.

12. The method of claim 9 where said telephone is associated with at least one of call center, automated call distributor.

13. The method of claim 1 where said data represents at least one of a(n); image, JPEG encoded image, video, streaming video, WAV encoded video, MPEG encoded video, REAL encoded video, graphics, and environmental information.

14. A method of sending data comprising the steps of:

sending a telephone number related to the data destination;

sending an indication of desire to send data;

dynamically determining at least one characteristic of said data destination; and sending the data to said destination other than through said telephone number based on said at least one characteristic of the data destination.

15. The method of claim 14 further comprising the step of:

sending at least one characteristic of the data.

16. The method of claim 14 further comprising the step of:

establishing a communication link with a service provider.

17. The method of claim 16 were the establishing includes dialing a telephone number.

18. The method of claim 14 where said data represents at least one of a(n):

image, JPEG encoded image, video, streaming video, WAV encoded video, MPEG encoded video, REAL encoded video, graphics, and environmental information.

19. A method of receiving data comprising the steps of:

registering a telephone number associated with the receiving of data and at least one parameter associated with the receiving of said data, said receiving being other than data transmission to said telephone number through the PSTN; and receiving said data in a manner associated with at least one said parameter.

20. A method of receiving data in a system including multiple data destination addresses comprising the steps of:

receiving a telephone number associated with a sender of a request for data;

dynamically determining at least one data destination address other than the telephone associated with the telephone number based on said received telephone number; and facilitating transmission of said data to at least one said determined data destination address.

21. The method of claim 20 where said facilitating includes one or more of the following:

sending the data destination address to the data sender, sending the data destination address to a data communication service provider, buffering said data and pushing it to said data destination address, buffering said data and sending it on request to said data destination address.

22. A method of receiving voice and data at a call center comprising the steps of:

terminating the voice at a call center station;

receiving a called number;

dynamically determining a data destination address based on the called number, said data destination address being other than a telephone associated with the called number; and accessing data at said data destination address.

23. The method of claim 20 where said data represents at least one of a(n):

image, JPEG encoded image, video, streaming video, WAV encoded video, MPEG encoded video, REAL encoded video, graphics, and environmental information.

24. A system for associating voice and data information over a telephone network, the system comprising:

one or more computers with one or more memories, one or more central processing units, and one or more telephone connections to one or more telephone networks;

a receiving process that receives one or more voice streams and one or more data streams from one or more senders through one of the telephone connections, the voice stream being associated with one or more telephone numbers of one or more respective telephone receivers;

an association process for associating at least one destination address for the data stream with one or more of the telephone numbers; and a transmission process that sends the data stream to the associated destination address and the voice stream to the associated telephone number.

25. A system for facilitating data communication between a data sender and at least one data recipient, said data recipient associated with a telephone number but not accessible through a telephone call to said number, said system comprising:

one or more computers with one or more memories, one or more central processing units, and one or more network connections to one or more networks;

a receiving process for receiving at least one telephone number associated with a data destination;

a receiving process for receiving an indication that data is to be communicated;

a determining process for using said at least one telephone number to dynamically determine at least one characteristic of said data destination; and an enabling process to enable the data to be communicated to said data recipient based on said determining at least one characteristic of said data destination and not through a telephone call to said number.

26. A computer program product in a computer readable medium for use in a data processing system, for facilitating data communication between a data sender and at least one data recipient, said data recipient associated with a telephone number but not accessible through a telephone call to said number, the computer program product comprising:

first instructions for receiving a telephone number associated with a data destination;

second instructions for receiving an indication that data is to be communicated;

third instructions for using said telephone number to dynamically determine at least one characteristic of said data destination; and fourth instructions for enabling the data to be communicated to said data recipient based on said at least one characteristic of said data destination and not through a telephone call to said number.

* * * * *